(12) United States Patent
Henning et al.

(10) Patent No.: US 8,099,969 B2
(45) Date of Patent: Jan. 24, 2012

(54) PASSENGER CAR AIR-CONDITIONING SYSTEMS WITH ADSORPTION HEAT PUMPS

(75) Inventors: Hans-Martin Henning, Freiburg (DE);
Walter Mittelbach, Kirchzarten (DE)

(73) Assignees: Fraunhofer-Gesellschaft zur Foerderung der angewandten Forschung E.V., Munich (DE); SorTech AG, Halle (DE)

( * ) Notice: Subject to any disclaimer, the term of this patent is extended or adjusted under 35 U.S.C. 154(b) by 543 days.

(21) Appl. No.: 11/718,689

(22) PCT Filed: Nov. 2, 2005

(86) PCT No.: PCT/EP2005/011699
§ 371 (c)(1),
(2), (4) Date: Oct. 9, 2007

(87) PCT Pub. No.: WO2006/048244
PCT Pub. Date: May 11, 2006

(65) Prior Publication Data
US 2008/0066473 A1 Mar. 20, 2008

(30) Foreign Application Priority Data
Nov. 5, 2004 (DE) .......................... 10 2004 053 436

(51) Int. Cl.
*F25B 15/16* (2006.01)
(52) U.S. Cl. .......................................... 62/109; 62/480
(58) Field of Classification Search ............ 62/100–109, 62/476–482
See application file for complete search history.

(56) References Cited

U.S. PATENT DOCUMENTS

| | | | |
|---|---|---|---|
| 4,078,399 A * | 3/1978 | Sugimoto et al. | 62/476 |
| 4,408,468 A | 10/1983 | Alefeld et al. | |
| 4,548,046 A | 10/1985 | Brandon et al. | |
| 4,694,659 A * | 9/1987 | Shelton | 62/106 |
| 4,902,059 A * | 2/1990 | Tritton | 293/117 |
| 5,016,448 A * | 5/1991 | Plzak | 62/476 |
| 5,024,064 A | 6/1991 | Yonezawa et al. | |
| 5,477,706 A * | 12/1995 | Kirol et al. | 62/480 |

(Continued)

FOREIGN PATENT DOCUMENTS

| | | |
|---|---|---|
| DE | 1 9640397 | 4/1997 |
| EP | 0840077 | 5/1998 |
| JP | 7-260286 | 10/1995 |
| JP | 2004-175269 | 6/2004 |

OTHER PUBLICATIONS

English Language abstract of EP 0840077.

(Continued)

*Primary Examiner* — Mohammad Ali
(74) *Attorney, Agent, or Firm* — Greenblum & Bernstein, P.L.C.

(57) ABSTRACT

A system and method for air-conditioning motor vehicles and, in particular, to an air-conditioning systems for motor vehicles having adsorption heat pumps. The apparatus includes a two adsorber chambers, each connected to a condenser and an evaporator via different connection elements; a vacuum shell for enclosing the adsorber chambers, the condenser, and the evaporator, wherein the vacuum shell is not self-supporting; and one or more adsorbers housed in the adsorber chambers, wherein the adsorbers are comprised of a carrier material coated by a sorbent. The method includes using an adsorption heat pump having one or more adsorber chambers, wherein adsorption and desorption are alternated between the adsorber chambers. The instant abstract is neither intended to define the invention disclosed in this specification nor intended to limit the scope of the invention in any way.

22 Claims, 5 Drawing Sheets

U.S. PATENT DOCUMENTS

| | | | | |
|---|---|---|---|---|
| 5,732,569 A | * | 3/1998 | Sanada et al. | 62/481 |
| 5,768,908 A | | 6/1998 | Tanaka et al. | |
| 5,901,780 A | * | 5/1999 | Zeigler et al. | 165/42 |
| 6,155,073 A | * | 12/2000 | Gray | 62/480 |
| 6,709,739 B1 | * | 3/2004 | Mullen et al. | 428/313.9 |
| 6,994,154 B2 | * | 2/2006 | Nagashima et al. | 165/134.1 |

OTHER PUBLICATIONS

Translation of Chinese Office Action dated Sep. 30, 2010 conducted in Chinese Appln. No. 2005 80037667.8.

Translation of Japanese Office Action dated Mar. 29, 2011 conducted in Japanese Patent Appln. No. 2007-539526.

* cited by examiner

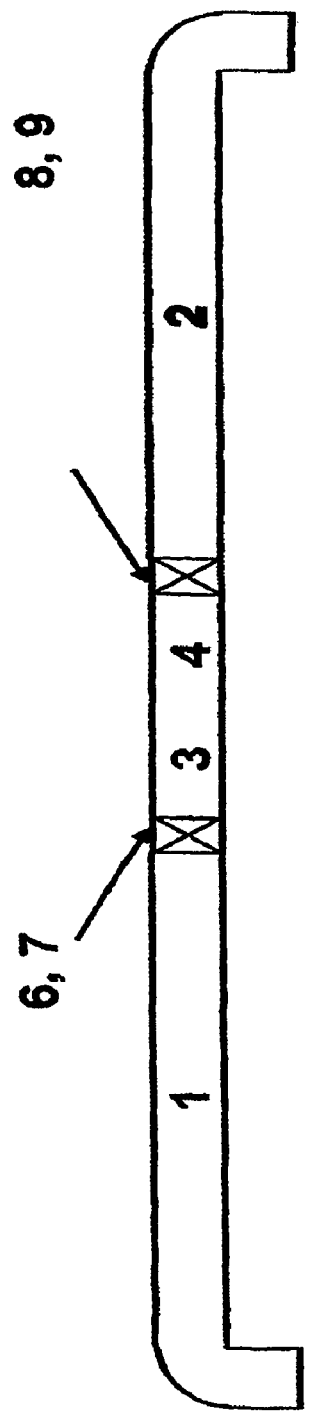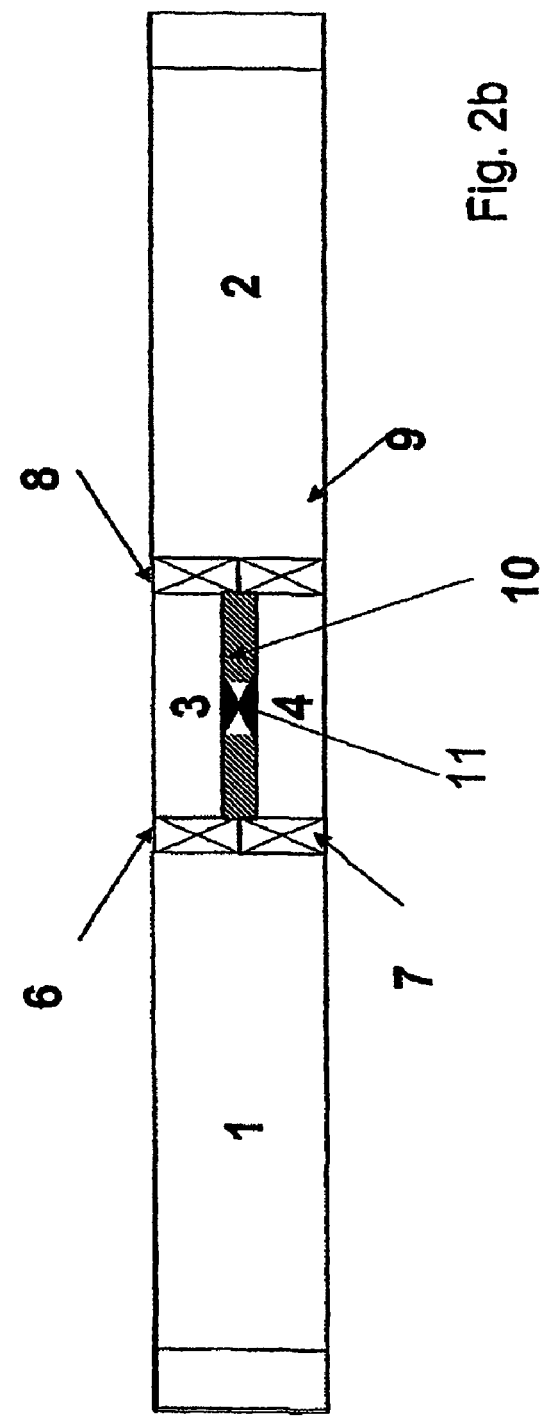

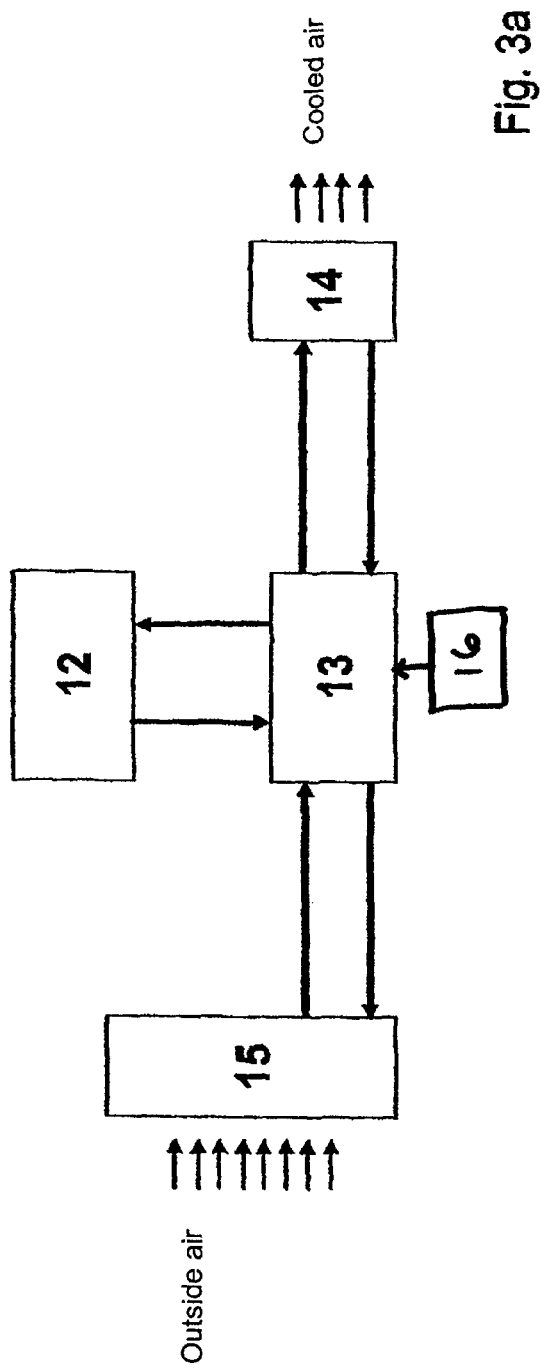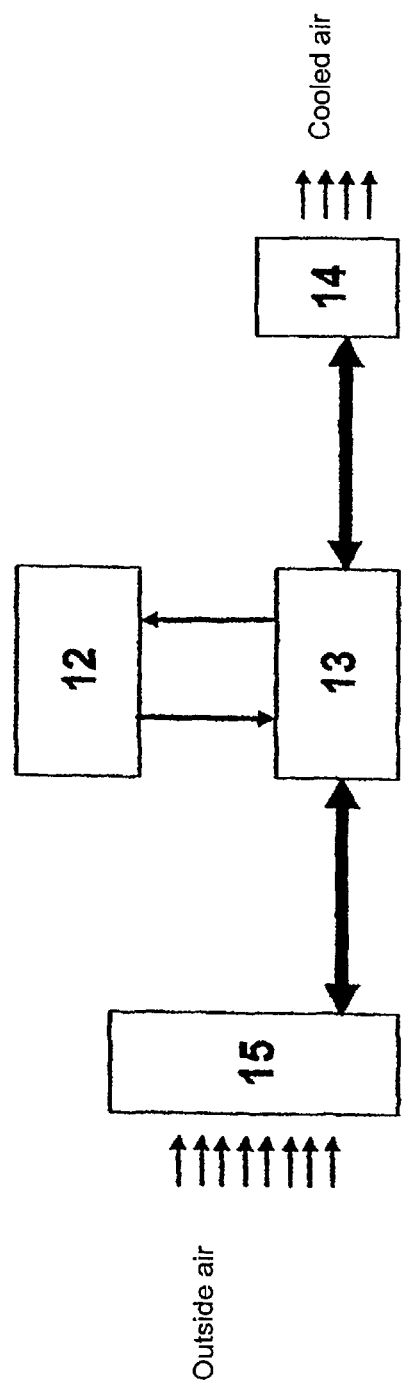

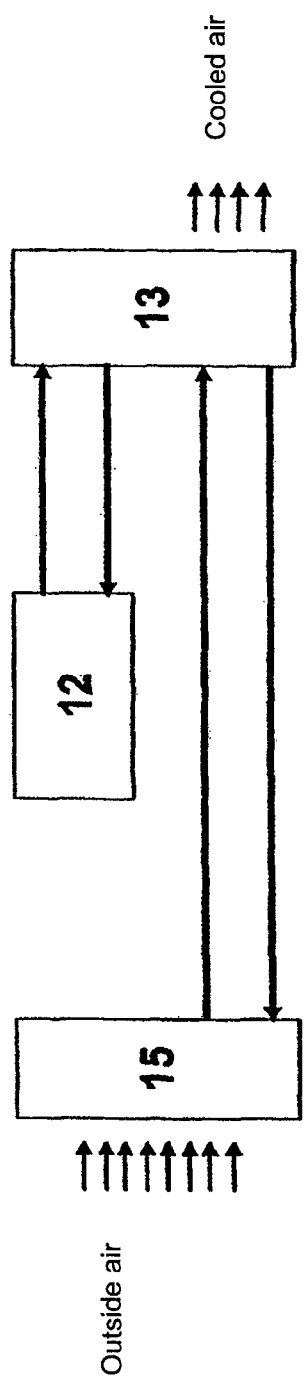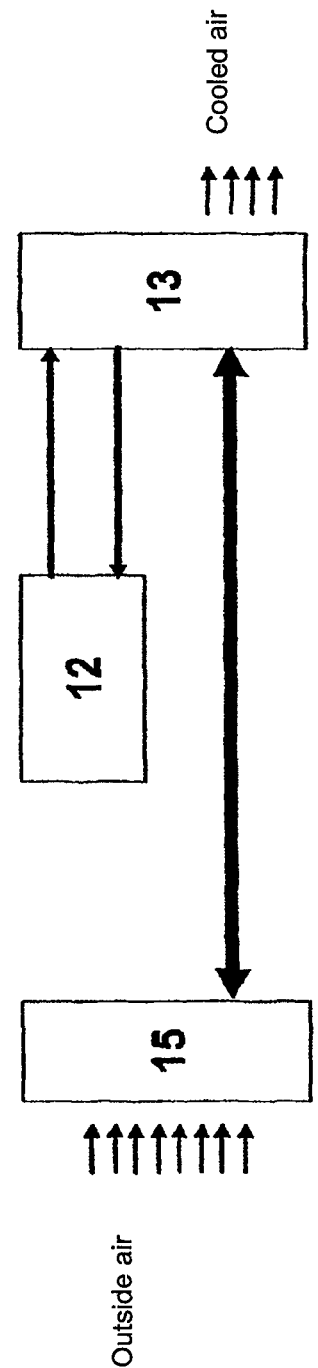

PASSENGER CAR AIR-CONDITIONING SYSTEMS WITH ADSORPTION HEAT PUMPS

CROSS-REFERENCE TO RELATED APPLICATIONS

The present application is a U.S. National Stage of International Patent Application No. PCT/EP2005/011699 filed Nov. 2, 2005, and claims priority under German Patent Application No. 10 2004 053 436.5 filed Nov. 5, 2004. Moreover, the disclosure of International Patent Application No. PCT/EP2005/011699 is expressly incorporated by reference herein in its entirety.

BACKGROUND OF THE INVENTION

1. Field of the Invention

The present invention relates to air-conditioning systems for motor vehicles and, in particular, to air-conditioning systems for motor vehicles having adsorption heat pumps.

2. Discussion of Background Information

Air-conditioning systems for motor vehicles are currently implemented by compression refrigerating machines which are driven by motors using V-belts. R134a (Tetrafluoroethane) is typically used as a refrigerant. The disadvantage of this is that R134a and other HFHC have a high greenhouse potential. Because of the high leak rates in motor vehicle air-conditioning systems, the use of less harmful refrigerants, such as $CO_2$, is being developed. However, the significant additional fuel consumption of approximately 1 l/100 km/h may not be reduced in this way. Compression refrigerating machines also may not typically be operated when the drive engine of the motor vehicle is turned off. This results in uncomfortably high stationary temperatures. The high stationary temperatures also require a high-performance design for the compression refrigerating machines to achieve pleasant temperatures in the vehicle interior within an acceptably short time after the drive engine has been started.

Because of the above-mentioned disadvantages, there have been various attempts to use thermally driven heat pumps, in particular adsorption heat pumps, for air conditioning motor vehicles. However, these attempts have not yet been able to prevail in the market up to this point, because they occupy too much space.

SUMMARY OF THE INVENTION

Accordingly, the present invention is directed to provide an adsorption heat pump which has a compact construction and is suitable for operation in motor vehicles. Furthermore, the present invention is directed to provide a method for continuous air conditioning using adsorption heat pumps. In addition, suitable uses of adsorption heat pumps in vehicle air conditioning technology are to be specified. These features are achieved by the independent claims. Advantageous refinements are found in the subclaims.

It has been recognized according to the present invention that an adsorption heat pump for air conditioning a motor vehicle having two adsorber chambers, which are each connected to a condenser and an evaporator, may be implemented particularly compactly and robustly if carrier material is coated with a sorbent. By coating suitable carrier materials, large areas—which are available for the adsorption and desorption—may be provided in a small space. Above all, significantly better heat supply to, and dissipation from, the sorbent is achieved by coating because the heat conduction between carrier material and sorbent is significantly improved. The carrier material, typically metal having good heat conduction properties, may be well cooled and/or heated by a heat exchanger. The carrier material may be a configuration of multiple aluminum plates, for example, which are cooled by coolant water. In conventional adsorption heat pumps, the sorbent is provided as bulk material. The heat conduction to a possible heat exchanger is poor in this case.

The adsorber chambers, the condenser, and the evaporator are additionally enclosed by a vacuum shell which is not self-supporting. A space-saving, and above all a weight-saving embodiment, of the vacuum shell is thus possible. A weight-saving embodiment is important in the motor vehicle to save fuel and to obtain better acceleration with the same motorization. A self-supporting vacuum shell may be used because the vacuum shell is supported by built-in parts.

A further possibility for implementing an adsorption heat pump for particularly space-saving results occurs when the evaporator and the condenser are situated between the two adsorber chambers. To return the working agent released upon the desorption to the evaporator, which is condensed in the condenser, a condensate recirculation line is located between the condenser and the evaporator. To maintain the higher pressure in the condenser and lower pressure in the evaporator, a pressure-reducing connection element, typically implemented as a throttle valve, is provided in the condensate recirculation line. Valves may be provided for the connection elements existing between the adsorber chambers as well as the evaporator and condenser.

The above-mentioned construction is also particularly suitable for adsorption heat pumps in which carrier material is coated with sorbent and a self-supporting vacuum shell is provided.

Preferably, thermohydraulic valves are used as the connection elements between adsorber chambers and the condenser or evaporator, respectively. Therefore, in an adsorber chamber heated for desorption, the valve to the condenser is opened by the high temperature and the valve to the evaporator is closed. It is also possible that the valve to the evaporator opens and the valve to the condenser closes due to cooling during the adsorption.

An energy-saving mode of operation for the adsorption heat pump may be achieved if a heat exchanger is provided, in which heat obtainable from the drive engine may be supplied to the sorbent to be desorbed. Sufficient waste heat is already available to desorb the sorbent after a brief operating time by the drive engine. The heat arising in the drive engine may be removed from the exhaust gas via the radiator and/or via a heat exchanger. To allow operation of the adsorption heat pump independently of the operation of the drive engine, the necessary heat is alternatively or additionally provided by the auxiliary heater.

To allow a compact and weight-saving construction, the heat exchanger, using heat which is supplied during the desorption, is designed in such a way that the heat arising during the adsorption may be dissipated. For this purpose, a valve may be attached to the heat exchanger, which allows a secondary medium to be caused to flow to the drive engine's radiator or to an external radiator to dissipate the heat released during the adsorption.

The cold which may be generated in the evaporator may be transferred to an air cooler by a heat transfer medium and/or a heat pipe. The air pumped into an area to be cooled may be cooled in this air cooler. In general, the passenger cell is to be cooled. However, cooling the cargo space of a truck which transports perishable products is also conceivable. The transfer of the heat by a heat transfer medium, or by a heat pipe, has the advantage that the evaporator may be implemented smaller, because a relatively small area is needed to transfer the cold from the evaporator to a liquid heat transfer medium or to a heat pipe.

However, it is also possible to cool the air yet to be cooled directly in the evaporator. This has the advantage that the evaporator may have a higher temperature than in the preceding alternative to obtain sufficiently cool air. In the event of a higher temperature in the evaporator, higher efficiency of the adsorption heat pump may be achieved for thermodynamic reasons.

A compact construction of the condenser is also achieved if the heat arising in the adsorber chambers and/or in the condenser may be transferred by a liquid heat transfer medium and/or a heat pipe to a recooling unit, in which the heat may be transferred to the outside air. An integration into the cooling system of the drive engine is also conceivable.

If it is made possible for the heat arising in the adsorber chambers and/or in the condenser to be transferred directly to the outside air, the temperature difference between the outside temperature and the condenser temperature may be less, because the temperature difference needed for the transfer of the heat to an intermediate cooling loop is dispensed with. This ensures more efficient operation of the adsorption heat pump, in particular at high temperatures of the outside air.

Suitable sorbents for an adsorption heat pump for the air conditioning of motor vehicles are zeolites. Other tectosilicates and amorphous open-pored silicates, such as silica gels, or activated carbons are also suitable. In principle, all sorbents known from adsorption heat pump technology come into consideration.

Water is suitable as a working agent because it has favorable thermodynamic properties, and also because it is inexpensive and convenient. Methanol or methanol-water mixtures are also suitable. In principle, all known working agents may be used.

The comfort may be significantly increased if an adsorption heat pump controller is provided that allows air conditioning at a predefined time and/or after receiving a signal which may be triggered outside the vehicle. The passenger cell of a motor vehicle sometimes heats up significantly when stationary in the event of corresponding weather. Even high performance air-conditioning systems require a long time to provide pleasant temperatures in the passenger cell. The required high-performance design of the air-conditioning systems results in increased space demand, increased weight, and increased power consumption during operation. This may be avoided if the air conditioning starts at a predefined time before the planned beginning of travel. Because it is not often established when travel will begin again upon leaving the vehicle, it is convenient if the air conditioning may be triggered by the user via a signal, which may be triggered outside the vehicle. This may be performed, for example, using radio devices, mobile telephones, or other devices for wireless signal transmission. The operation of the air-conditioning system when stationary is not possible with compression refrigerating machines, as are typically used for vehicle air conditioning. In contrast, adsorption heat pumps may be operated using an auxiliary heater, for example.

A further embodiment, for a compact construction of an adsorption heat pump is achieved if a metal sponge is provided for heat transfer from the sorbent to a secondary medium flowing in a heat exchanger. The metal sponge may be used as a carrier medium for the sorbent. Therefore, the adsorber chambers may be shaped freely. They may be designed flexibly and use free space in the engine compartment or other areas of the motor vehicle. A heat pump having a metal sponge for heat transfer and/or as a carrier material for the sorbent, generally provides the cited advantages in all adsorption heat pumps. Therefore, in principle, the embodiments of the adsorption heat pump described in the following are possible in all adsorption heat pumps.

It is thus possible to situate the adsorber chambers in such a way that the metal sponge may be used to absorb kinetic energy in the event of an accident. Therefore, the adsorption heat pump is simultaneously used as a safety device. This increases the safety at the same weight or ensures equal safety while saving weight.

It is especially favorable for this embodiment to implement the adsorption heat pump as a bumper of the motor vehicle. The adsorption heat pump may thus be housed in a way that saves space and weight. In addition, the cooling by outside air may easily occur.

To be able to achieve quasi-continuous air conditioning for a motor vehicle in permanent operation, an adsorption heat pump having a first adsorber chamber and a second adsorber chamber is to be operated in such a way that the first adsorber chamber is adsorbed or desorbed alternately, and simultaneously the second adsorber chamber is desorbed or adsorbed, respectively. This method ensures quasi-continuous air conditioning in a simple way. For the adsorption of an adsorber chamber, there is an open connection between the relevant adsorber chamber and the evaporator, and no open connection between the relevant adsorber chamber and the condenser. In contrast, for the desorption, there is an open connection for the relevant adsorber chamber to the condenser and no open connection to the evaporator.

In an alternative embodiment, after the drive engine of the motor vehicle is turned off, the adsorber chambers are desorbed without simultaneous adsorption. After the drive engine is turned off, the necessity of air-conditioning the motor vehicle is typically dispensed with. However, the passenger cell frequently heats up strongly, so that it is to be expected that air conditioning will be necessary without the heat necessary for the desorption that is able to be obtained from the waste heat of the drive engine. Therefore, it is favorable to use waste heat still present after the drive engine is turned off to desorb the adsorber chambers, even if no adsorption is currently occurring.

An adsorption heat pump may be used as a cold or heat accumulator, by keeping the sorbent in a desorbed state. The use as a cold accumulator is performed by using the possibility of generating cold in the evaporator by adsorption of the sorbent. The fact that heat is released upon the adsorption is used when employing it as a heat accumulator. This heat may be used for preheating the drive engine, for example. Fuel consumption and wear may thus be reduced. Heating the passenger cell is thus also possible in an energy-saving way.

Specifications will be described in greater detail in the following on the basis of the figures. Additional exemplary embodiments and advantages of the present invention may be ascertained by reviewing the present disclosure and the accompanying drawing.

BRIEF DESCRIPTION OF THE DRAWINGS

FIG. 2a shows a top view and FIG. 2b shows a side view of an adsorption heat pump implemented as a bumper;

FIGS. 3a and 3b show an incorporation of the adsorption heat pump into the air-conditioning system of a vehicle having separate heat exchangers;

FIGS. 5a and 5b show embodiments having direct heating of the evaporator by the circulating air.

DETAILED DESCRIPTION OF THE PRESENT INVENTION

Figure 1:
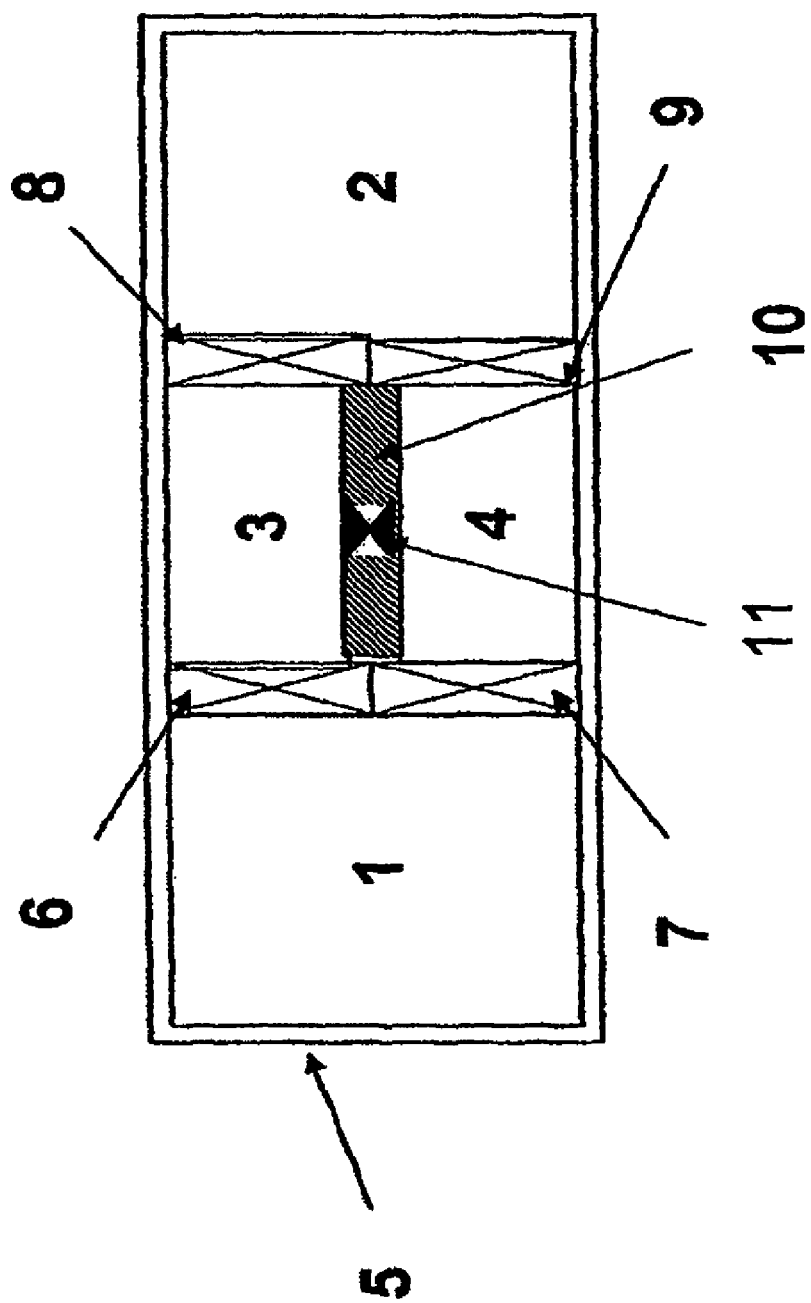
FIG. 1 shows a basic construction of the adsorption heat pump according to the present invention.

FIG. 1 shows the basic construction of the adsorption heat pump according to the present invention. The first adsorber chamber 1, the second adsorber chamber 2, the condenser 3, and the evaporator 4 are enclosed by a vacuum shell 5 which is not self-supporting. The adsorber chambers 1, 2 are each connected by valves 6, 7, 8, 9 to the condenser 3 and the evaporator 4. The condenser 3 and evaporator 4 are situated between the adsorber chambers. The condenser 3 and evaporator 4 are connected by a condensate recirculation line 10, which has a throttle valve 11.

FIG. 2a shows a top view of an adsorption heat pump which is implemented as a bumper. Metal sponges are inserted in the adsorber chambers as heat exchangers and/or may be used as a carrier medium for the sorbent. This allows the implementation of the adsorption heat pump as a bumper which is shown. A side view of the adsorption heat pump implemented as a bumper is shown in FIG. 2b.

FIG. 3a shows the incorporation of the adsorption heat pump in the air-conditioning system of the vehicle. The waste heat originating from the drive engine 12 is supplied to the adsorption heat pump 13. A water-glycol mixture is used as the heat exchanger medium. The heat necessary for the desorption is thus supplied. The heat must be supplied at a temperature of at least 70° C. for an adsorption heat pump using sorbent zeolite and having water as the working agent.

The cold generated in the evaporator 4 of the adsorption heat pump 13 is transported into the air cooler 14 using a water-glycol mixture. The cold is transferred via a heat exchanger to the air yet to be cooled in the air cooler 14. The cooled air is pumped into the passenger cell. The heat released during the adsorption and condensation is transported to the recooling unit 15 using a water-glycol mixture. Further, comfort may be significantly increased if an adsorption heat pump controller 16 is provided that allows air conditioning at a predefined time and/or after receiving a signal which may be triggered outside the vehicle. The passenger cell of a motor vehicle sometimes heats up significantly when stationary in the event of corresponding weather. The air conditioning can be started at a predefined time before the planned beginning of travel. Because it is not often-established when travel will begin again upon leaving the vehicle, it is convenient if the air conditioning may be triggered by the user via a signal, which may be triggered outside the vehicle. This may be performed, for example, using radio devices, mobile telephones, or other devices for wireless signal transmission. The operation of the air-conditioning system when stationary is not possible with compression refrigerating machines, as are typically used for vehicle air conditioning. In contrast, adsorption heat pumps may be operated using an auxiliary heater, for example.

FIG. 3b shows an embodiment in which the heat transport between the adsorption heat pump, the recooling unit, and the air cooler is performed in each case via a heat pipe.

Figure 4A:
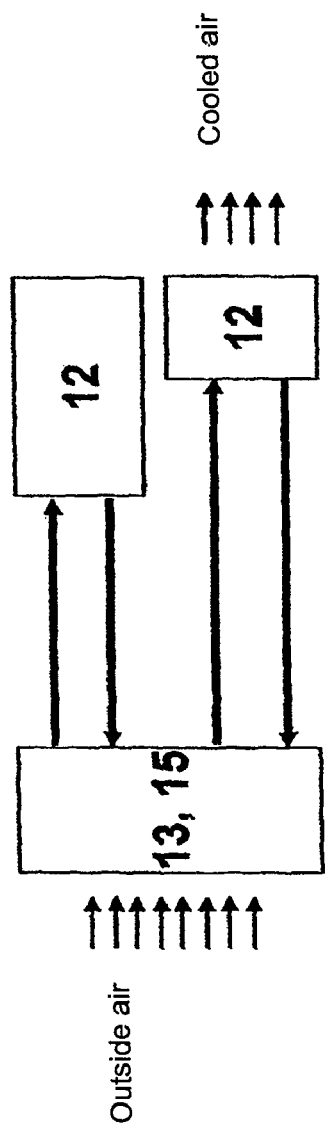
FIGS. 4a and 4b show embodiments having an integrated recooling unit.
Figure 4B:
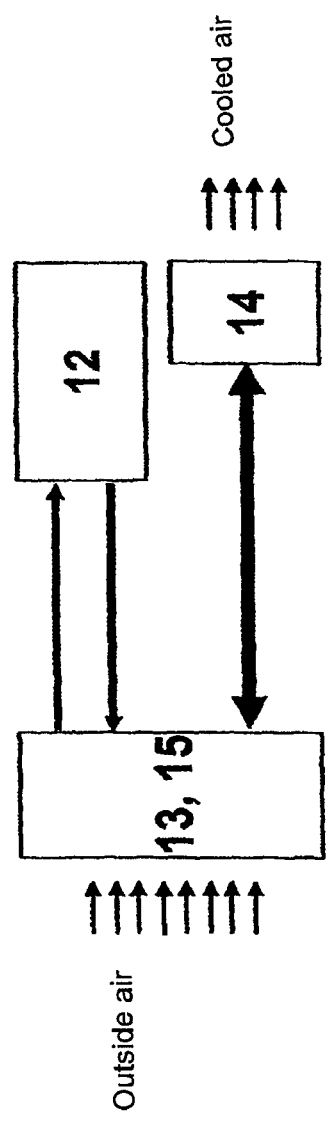

FIG. 4a shows an embodiment without an air cooler 14. In this case, the heat arising in the adsorption heat pump 13 is transferred directly to the outside air. FIG. 4b shows a variation in which the transfer of the cold from the adsorption heat pump 13 to the air cooler 14 is performed by a heat pipe. The heat needed for the desorption is transferred from the drive engine 12 using a water-glycol mixture to the adsorption heat pump 13.

FIG. 5a shows an embodiment in which the cold generated in the evaporator 4 is transferred directly to the air which is pumped into the passenger cell. The heat released during the adsorption and in the condenser 3 is dissipated to the recooling unit 15 using a water-glycol mixture. Alternatively, as shown in FIG. 5b, the heat may also be transferred using a heat pipe to the recooling unit 15. The heat needed for the desorption is transferred from the drive engine 12 using a water-glycol mixture to the adsorption heat pump 13.

LIST OF REFERENCE NUMERALS 1 first adsorber chamber
2 second adsorber chamber
3 condenser
4 evaporator
5 vacuum shell
6 valve between first adsorber chamber and condenser
7 valve between first adsorber chamber and evaporator
8 valve between second adsorber chamber and condenser
9 valve between second adsorber chamber and evaporator
10 condensate recirculation line
11 throttle valve
12 drive engine
13 adsorption heat pump
14 air cooler
15 recooling unit

The invention claimed is:

1. An adsorption heat pump for air conditioning a motor vehicle comprising:
   a first adsorber chamber;
   a second adsorber chamber;
   a condenser;
   an evaporator;
   a vacuum shell structured and arranged to enclose the first adsorber chamber, the second adsorber chamber, the condenser, and the evaporator; and
   at least one of the first and second adsorber chambers including adsorbers having a carrier material coated by a sorbent.

2. The adsorption heat pump for air conditioning a motor vehicle of claim 1, wherein the evaporator and the condenser are structured between the first adsorber chamber and the second adsorber chamber.

3. The adsorption heat pump for air conditioning a motor vehicle of claim 1, further comprising:
   a first connection element arranged to connect the first adsorber chamber to the condenser;
   a second connection element arranged to connect the first adsorber chamber to the evaporator;
   a third connection element arranged to connect the second adsorber chamber to the condenser; and
   a fourth connection element arranged to connect the second adsorber chamber to the evaporator.

4. The adsorption heat pump for air conditioning a motor vehicle of claim 3, wherein the first connection element, the second connection element, the third connection element, and the fourth connection element are composed of thermohydraulic valves.

5. The adsorption heat pump for air conditioning a motor vehicle of claim 1, further comprising a first heat exchanger in the first adsorber chamber and a second heat exchanger in the second adsorber chamber, whereby heat is supplied to the sorbent to be desorbed.

6. The adsorption heat pump for air conditioning a motor vehicle of claim 5, whereby heat is obtained from a drive engine and/or from an auxiliary heater.

7. The adsorption heat pump for air conditioning a motor vehicle of claim 1, wherein a heat exchanger is structured and arranged to dissipate heat released during adsorption.

8. The adsorption heat pump for air conditioning a motor vehicle of claim 1, further comprising at least one of a heat transfer medium and a heat pipe, wherein the evaporator generates cold, which is transferred by the at least one of the heat transfer medium and the heat pipe to an air cooler, whereby air is transported into a cooling area.

9. The adsorption heat pump for air conditioning a motor vehicle of claim 1, wherein cold generated in the evaporator is transferred directly to air transported into a cooling area.

10. The adsorption heat pump for air conditioning a motor vehicle of claim 8, whereby heat arising in at least one of the first adsorber chamber, the second adsorber chamber, and the condenser is transferred by the at least one of the heat transfer medium and the heat pipe to a recooling unit, whereby heat is dissipated to outside air.

11. The adsorption heat pump for air conditioning a motor vehicle of claim 1, wherein heat arising in at least one of the first adsorber chamber, the second adsorber chamber, and the condenser is dissipated directly to outside air.

12. The adsorption heat pump for air conditioning a motor vehicle of claim 1, wherein the sorbent is a zeolite.

13. The adsorption heat pump for air conditioning a motor vehicle of claim 1, wherein water is a working agent.

14. The adsorption heat pump for air conditioning a motor vehicle of claim 1, further comprising a controller structured and arranged to allow air conditioning by at least one of a predefined time and after receiving a signal that is triggered from outside the vehicle.

15. The adsorption heat pump for air conditioning a motor vehicle of claim 1, further comprising a metal sponge structured and arranged to transfer heat from the sorbent to a secondary medium flowing in a heat exchanger.

16. The adsorption heat pump for air conditioning a motor vehicle of claim 15, wherein the first adsorber chamber and the second adsorber chamber are situated in a motor vehicle such that the metal sponge is used to absorb kinetic energy in the event of accident.

17. The adsorption heat pump for air conditioning a motor vehicle of claim 1, wherein the adsorption heat pump is either structured as a motor vehicle bumper or arranged as a part of a motor vehicle bumper.

18. A method for air conditioning a motor vehicle with the adsorption heat pump of claim 1, comprising preheating an engine of the motor vehicle with heat released from at least one of the first or second adsorption chambers.

19. A method for air conditioning a motor vehicle using the adsorption heat pump of claim 1, further comprising keeping the sorbent in a desorbed state to use the adsorption heat pump as a cold accumulator or as a heat accumulator.

20. A method for air conditioning a motor vehicle using the adsorption heat pump of claim 1, comprising alternating adsorption and desorption between the first and second adsorber chambers, where the second adsorber chamber simultaneously desorbs during adsorption in the first adsorber chamber and simultaneously adsorbs during desorption in the first adsorber chamber.

21. The method for air conditioning a motor vehicle using an adsorption heat pump of claim 20, wherein after a drive engine of a motor vehicle is turned off, one of the first adsorber chamber and the second adsorber chamber is desorbed without simultaneous adsorption.

22. An adsorption heat pump for air conditioning a motor vehicle comprising:
   a first adsorber chamber;
   a second adsorber chamber;
   a condenser;
   an evaporator;
   a vacuum shell structured and arranged to enclose the first adsorber chamber, the second adsorber chamber, the condenser, and the evaporator; and
   at least one of the first and second adsorber chambers including adsorbers having a carrier material coated by a sorbent,
   wherein the vacuum shell is not self-supporting.

* * * * *